Jan. 18, 1966   R. DE LA COUSSAYE   3,229,594
PACKAGING DEVICE
Filed April 5, 1962   5 Sheets-Sheet 1

INVENTOR.
RENE DE LA COUSSAYE
BY
OSTROLENK, FABER, GERB & SOFFEN
ATTORNEYS

INVENTOR.
RENE DE LA COUSSAYE
BY
OSTROLENK, FABER, GERB & SOFFEN
ATTORNEYS

INVENTOR.
RENE DE LA COUSSAYE
BY
OSTROLENK, FABER, GERB & SOFFEN
ATTORNEYS

Jan. 18, 1966  R. DE LA COUSSAYE  3,229,594
PACKAGING DEVICE
Filed April 5, 1962  5 Sheets-Sheet 5

INVENTOR.
RENE DE LA COUSSAYE
BY
OSTROLENK, FABER, GERB & SOFFEN
ATTORNEYS

3,229,594
PACKAGING DEVICE
Rene de la Coussaye, 4 Rue du Nord, Lille, France
Filed Apr. 5, 1962, Ser. No. 185,263
Claims priority, application France, Oct. 12, 1961, 875,710, Patent 1,309,972; Mar. 20, 1962, 891,637, Patent 81,430
10 Claims. (Cl. 93—36.9)

The present invention relates to a packaging device, in particular to a device for sticking gummed or adhesive tape on packages, boxes or packing cases.

There is frequent need for the tape to encircle the entire package when closing and/or reinforcing different parts of the package with gummed or adhesive strip.

When it is not necessary to pack a large number of packages per hour thus justifying the use of an automatic machine, the operation may be effected by hand with the aid of a special known machine under excellent conditions and with small labour costs. This machine comprises a table having an aperture through which adhesive tape is threaded from a suitable tape dispenser arranged beneath said aperture, and a rectilinear guide secured onto the table for movement of packages, along the table and over the aperture during the application of the tape to the package.

This known machine facilitates the application of as much sticky tape as desired with as much tape in the middle as on the edges of the package, forming a complete band therearound. Meanwhile, when it is desired to stick the tape onto the angles of the package, that is to say the edges of the box, the use of the known machine demands a certain number of different operations which slow down the work, and in which the box must be turned and displaced several times. Furthermore the tape can only be stuck on the angles one side at a time, while the other side abuts the guide which controls the position of the box.

At the present time, it has become more and more desirable and even necessary to reinforce the angles of the packages, boxes, etc., especially in the case of cardboard boxes. It is particularly necessary to be able to stick a gummed paper tape with speed onto the edges of the box perpendicular to the median closure line of the cardboard box, the tape passing all round the edges, and being stuck to the two walls which converge into each edge.

The present invention provides a new device which facilitates the sticking of tape onto the angles of packages, with great speed and precision.

A device according to the invention is constituted by a table provided with the elements mentioned above with respect to the known machine, but characterized by the fact that the guide bar comprises a first portion adapted to be secured flat onto the table laterally of the aperture and a box engaging portion carried by the first portion which overhangs the aperture and extends into a vertical plane which passes through the aperture so as to provide a space for one edge of the tape when the box is being pushed along the table with the tape sticking on and extending from the edge of the box.

In addition to this, an aperture is provided above the sticky tape, which traverses the table and is arranged to satisfy the three following conditions (1) the tape must traverse the table to a position situated outside the space formed between the box engaging portion of the guide bar and the table (2) the tape must be dispensed parallel to the bar (3) a plane perpendicular to the table passing through the tape must intersect the longitudinal box engaging portion of the guide bar.

In the device according to the invention, there is provided a second aperture for the passage of a second tape therethrough with cutting means for the second sticky tape arranged parallel to the first. This second aperture is situated in alignment with the opposite end of the package, to enable the taping of two opposed edges of the package at the same time.

Of course, the device may also include one or more guide bars of known type, cooperating with one or more known systems for unrolling and cutting the tape, to facilitate the sticking of tape onto the center region of the box.

In a modification, at least one of the apertures together with its tape dispenser is adjustable toward and away from the guide bar. It is thus possible to vary the spacing between the two tapes to take into account the length of the box.

The special guide bar or bars provided according to the invention may likewise be displaceable in the plane of the table with suitable clamping means being provided to locate the guide bar at any desired position.

On the other hand, the invention may be provided with fixed or longitudinally movable guide bars.

In general the special guide bars according to the invention may be constructed of iron plates, profiles, rods or frames of different materials, e.g. metal, plastics material, wood etc. Preferably, at least the edge intended to contact the package should be of natural or synthetic rubber or of a material having a high coefficient of friction with the boxes to be closed.

According to one embodiment of the invention, the device is provided with means for the automatic sticking down projecting parts of the tape.

Two types of pressure means are mounted in the path of the box to be closed. The first means is for closing and pressing the parts of the sticky tape projecting from the front face, perpendicular to the path of the box. The second means is for closing and pressing the parts of the tape projecting from the upper and lower faces which are parallel to the path of the box.

For a box of known dimensions the pressure means are fixed and positioned in such a way as to come directly into contact with the tapes and the left and the right lateral faces of the moving box; the device is such that the correct amount of pressure is applied to the tapes and the faces of the box. The box comes first into contact with said first means and then with the second means.

The pressure means for folding and sticking down the projecting widths of the tapes may be fixed on one or more independent supports on the table on which the box is moved. A particularly practical embodiment of these means is fixed preferably detachably and displaceably on the table; it may also be operatively connected to the tape dispenser. The table is generally provided with a raceway and guides along which the box may be moved.

The first means according to the invention may comprise at least one pair of vertical members, preferably more or less flexible, or mounted by resilient elements, to exert a suitable pressure with their external peripheries on each lateral left and right face of the box.

These members may be for example, flat squeegees, sufficiently flexible, and disposed vertically, the plane of the squeegees being parallel to the front face of the box or inclined by at least 90° to this face.

According to a preferred embodiment, which provides particularly favourable results, notably, good sticking, without folds and without any deterioration of the box and the tape, the vertical members are constituted by rollers mounted on vertical spindles and preferably formed of a rather flexible material. Whatever the particular shape of the vertical members serving as the vertical pressure means, their height must be a little less than that of the box, and they should be placed in such a manner that they move solely over the vertical tapes and not at all on the horizontal tapes positioned above and below the box.

The second means according to the invention may be constituted likewise by suitable squeegees situated in a manner to fold and press down the protruding parts of the horizontal tapes against the lateral left and right faces of the box. If squeegees are used it is preferable that they are in the form of squares or angles applied exactly to the solid longitudinal angles of the box; the horizontal side of the square abutting against the part of the gummed tape already stuck down, with the vertical side causing the projecting part of the tape to be folded down against the sides of the box.

The said second means for folding and pressing down the projecting parts of the horizontal tapes may likewise each be constituted by two pulleys or rollers mounted at right angles to one another and arranged in such a fashion as to roll respectively over the two parts of the tape covering a solid horizontal angle of the box.

A particular advantageous embodiment of the present invention insofar as the means for folding and pressing down the projecting parts of the horizontal tapes are concerned, provides special deviating or deflecting means constituted by portions of a spiral member with rectangular sides. The twist of the spiral is 90° so that the sides thereof are perpendicular to one another. Each of these deflecting means are positioned in such a way that one of the end sides is perpendicular to the side of the box and such that it first meets the tape and causes the tape to be folded down, during the displacement of the box. The other end side of the deflecting means is parallel to the side of the box and causes the folded tape to be pressed against the side of the box.

Use of these special deviating or flecting means facilitates the perfect sticking down of the projecting part of the gummed tape onto the right and left lateral faces of the box without forming creases, tears or splits.

Certain preferred but nonlimiting examples of the invention are described below.

Figure 1:
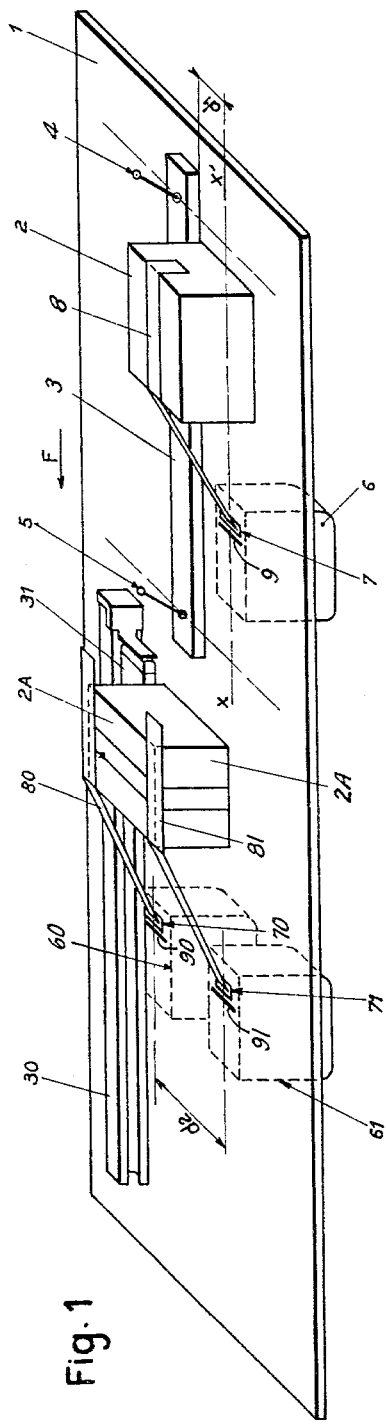
FIG. 1 shows a perspective view of a table provided with the device, and with packages to be closed at the beginning of the operation.

Referring to the drawings, FIG. 1 shows a table 1 with a package, packing case or box 2 on the right, which package is to be closed down the center by means of a gummed tape 8. At the left of the figure there is shown the box in a position 2A, onto which two gummed tapes 80 and 81 are to be placed on angles thereof.

On the right of the figure, the box 2 is shown at the beginning of the operation. It is displaced by hand in the direction shown by the arrow F, along the length of the guide bar 3, parallel to the axis $xx'$ corresponds to half the width of the box 2. This distance $d_1$ may be altered at will by displacing the bar 3 laterally, parallel to the axis $xx'$ according to the width of the box 2 to be closed. Levers 4 and 5 are provided to clamp the bar 3 into a suitable position. Such levers may be of any suitable design or of the type illustrated in French Patent 1,237,797, issued June 22, 1959, to René de la Coussaye, the inventor of the instant invention.

A housing 6 containing an unrolling-moistening device of a known type as illustrated is the aforementioned French patent, is mounted beneath table 1. An aperture 7 is provided in the table perpendicular to the axis $xx'$ for the passage of the gummed and moistened tape 8 therethrough.

On the left of FIG. 1 the box 2A is shown in contact with a secondary sliding bar 31 which moves inside a primary guide 30. The box 2A is moved by hand in the direction of the arrow F and draws the bar 31 therewith by friction between the box and the bar. To provide sufficient friction the edge of the bar is made of rubber material or of a material such as a metal brush. The distance $d_2$ between the axes of the gummed tapes 80 and 81 corresponds to the length of the box 2A. The apertures 70 and 71 provided in table 1 should be of sufficient length to allow the lateral displacement of housing 60 and 61, similar to housing 6. This has the effect of varying the distance $d_2$ as a function of length of the boxes 2A.

Figure 2:
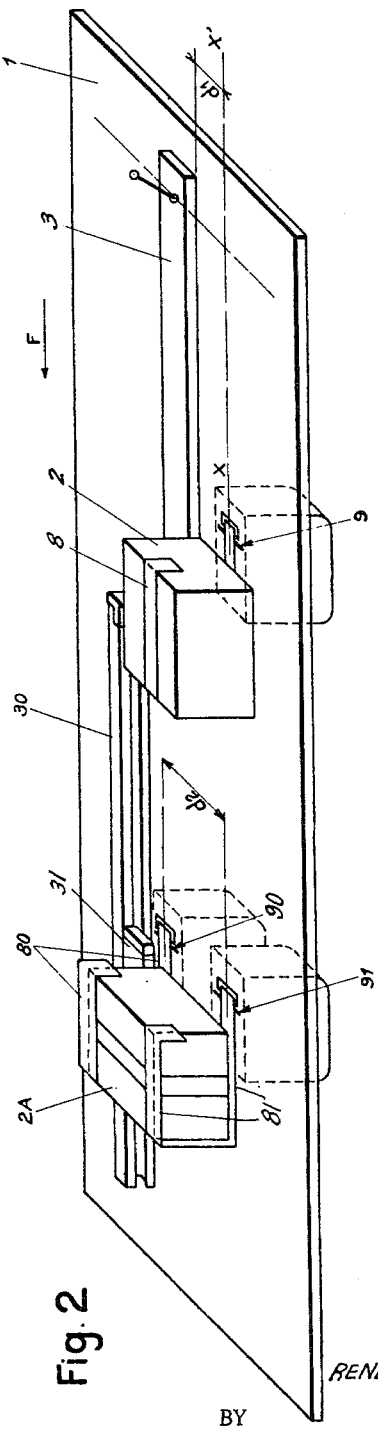
FIG. 2 shows the same installation with the packages to be closed at the end of the operation.

On the right hand side of FIG. 2, the operator slides the box 2 along, while holding it in contact with the guide bar 3, whereby the tape 8 is applied to the top, the side and the base of the box 2. A knife 9 of any known type such as illustrated in addition No. 78,522 issued October 13, 1960, to the aforementioned French patent, cuts the gummed tape 8. The work then passes into its final phase.

On the left-hand side of FIG. 2, the bar 31 is shown displaced to an extreme poistion. The projecting unadhered half of the tape 80 is positioned at the base of the box 2A, in the free space between the table 1, the secondary bar 31, the primary guide 30 and the right-hand side of the box. This projecting half of the tape 80 is not restricted by anything since the primary guide 30 is spaced from the box by a distance equal to the width of the visible part ($S_1$ of FIGURES 4 and 5) of the secondary bar 31. It can be seen that the tapes 80 and 81 encircle the box 2A and are adhered on only half its width.

The trailing parts of the tape will be applied by hand after being cut by the cutters 90 and 91. The operator then takes the box 2A out of contact with the sliding bar 31, and the bar returns to its initial position under the action of the spring system described further on.

Figure 3:
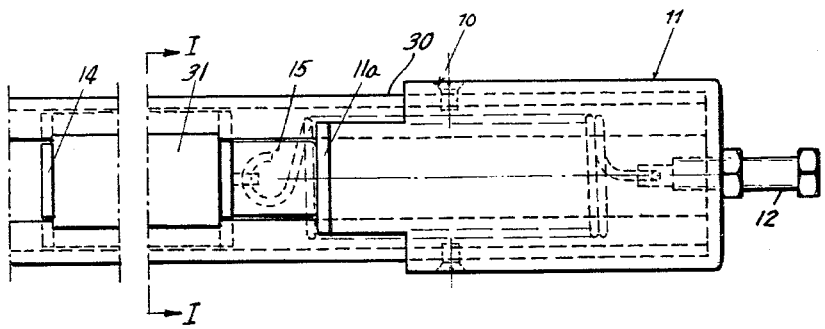
FIG. 3 is an elevational view of the guide device for placing tapes onto the edges of the box.
Figure 4:
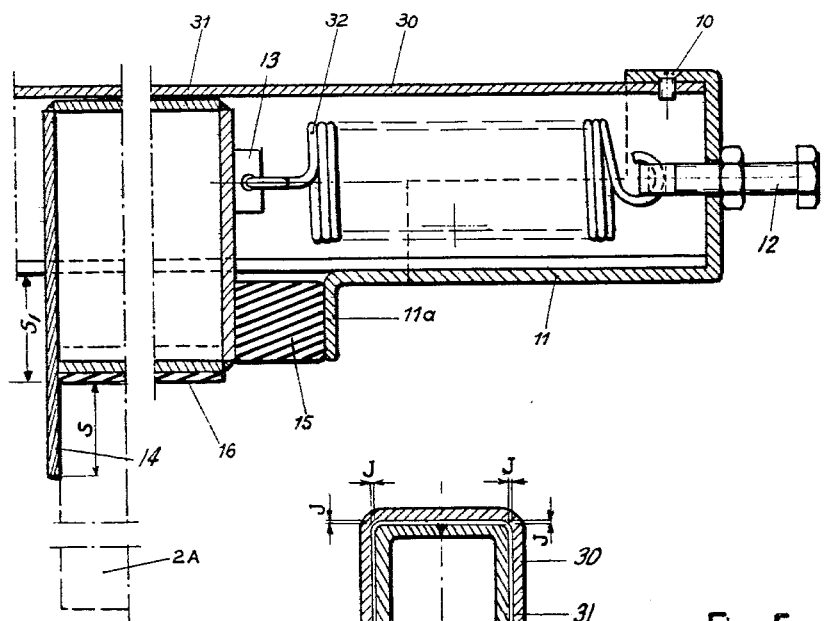
FIG. 4 is a plan view in section of the device shown in FIG. 3.

In FIGS. 3 and 4, a stop 11 is shown at the right hand end of the primary guide 30 fixed thereon by screws 10, and through which a screw threaded regulating rod 12 passes. A spring 32 connects the rod 12 to a fastening 13 mounted at one end of the sliding bar 31. At the other end of this bar 31 a thin and narrow tongue 14 extends a distance "S" of approximately 2 centimeters from the sliding bar 31 and serves as a driving abutment to draw the box 2A therewith. The tongue 14 is shown in the drawings but it is not an essential part of the invention. It is not used in the preferred form of the invention where the bar 31 is drawn along by the box by the friction between it and a strip roughened material 16. The operator, when sliding the box 2A in contact with the bar 31, provides longitudinal displacement thereof an account of the tongue 14 or of the friction. Guiding of the bar 31 is effected by the interior of the primary guide 30. At the end of the operation, after the cutting of the tape, the operator removes the box 2A from the bar 31 thus disengaging the tongue 14 from the box and allowing the bar 31 to be returned to its initial position under the biasing effect of spring 32. A damping or cushioning device 15, carried by bar 31 and constructed of rubber, cushions the effect of the blow from sliding bar 31 on abutment 11a of stop 11. The apparatus is then in a position to repeat the operation with the next box.

Figure 5:
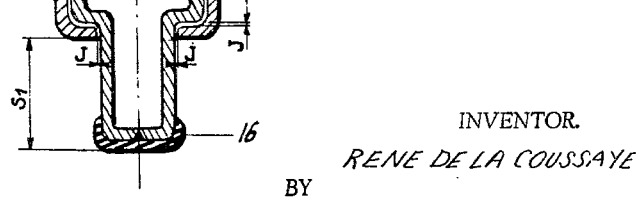
FIG. 5 shows a transverse section of the device shown in FIG. 3, along the line I—I of FIG. 3.

FIG. 5 shows a possible modification of the primary guide 30 with the box-engaging front surface of sliding bar 31 coated with a rubber layer 16. It is necessary to note here that in every case the width $S_1$ should be at least equal to half the width of the largest piece of gummed tape used so that unadhered portion of the tape may freely fit between the edge of the box and the primary guide 30. A play or clearance J should be provided between the profiles comprising the guide 30 and the sliding bar 31, in order to ensure freedom of movement of the sliding bar 31 within the guide 30.

Figure 6:
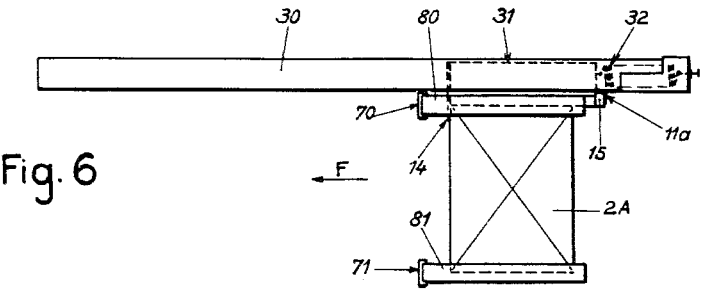
FIG. 6 is a schematic view, in plan, of the beginning of the operation for sticking the tapes onto the angles of the box.

FIG. 6 shows schematically the box 2A positioned against the sliding bar 31 and stopped longitudinally by the tongue 14. The cushioning device 15 is in contact with the abutment 11a. The spring 32 is at rest. The gummed tapes 80 and 81 passing through apertures 70 and 71, are applied by hand onto the upper face of the box 2A. This is the beginning of the operation. Displacement of the box 2A is effected by the hand in the direction of arrow F.

Figure 7:
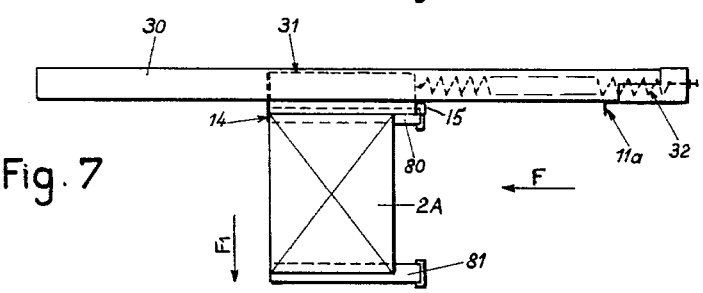
FIG. 7 is a schematic plan view of the end of the operation for sticking the tapes onto the angles of the box, the portions of tape applied on the top face of the box, however, being omitted for the sake of clarity.

FIG. 7 shows schematically the box 2A displaced a maximum distance in the direction of the arrow F. The spring 32 is tensioned. The sticky tapes 80 and 81 are shown stuck (by half their widths) to about three quarters of the periphery of the box 2A. After cutting of the tapes 80 and 81 the operator moves the box 2A in the direction of the arrow $F_1$. The tongue 14 then becomes disengaged and the bar 31 returns to its initial position under action of the spring 32.

Figure 8:
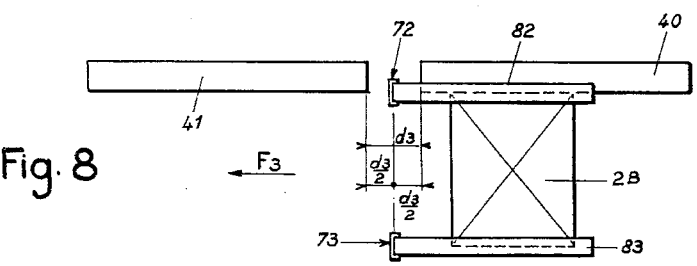
FIG. 8 and FIG. 9 show schematically a further embodiment for guiding the packages and for placing the tapes onto the angles of the box, the portions of tape applied on the top face of the box, however, being omitted in FIG. 9 for the sake of clarity.
Figure 10:
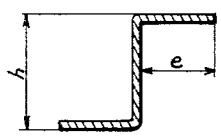
FIG. 10 shows a type of Z-profile for use as a guide bar.
Figure 11:
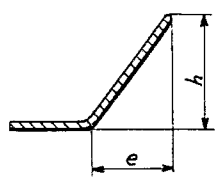
FIG. 11 shows a further type of profile for similar use.

FIG. 8 shows two guide bars 40 and 41, in the form of metal profiles which may be of the type shown in FIGURES 10 and 11, and which can be fixed on a table identical to that used in the preceding mounting. The distance $d_3$ between the bars 40 and 41 should be small enough to ensure a suitable guidance of the box 2B. This distance $d_3$ may be varied as a function of the practically at an equal distance $d_3/2$ from lines perpendicular to the ends of bars 40 and 41. The tapes 82 and 83 are shown adhered to the upper part of the box 2B.

At the beginning of the operation, the operator slides the box 2B in the direction of the arrow F3 while holding it against the guide bars 40 and 41.

Figure 9:
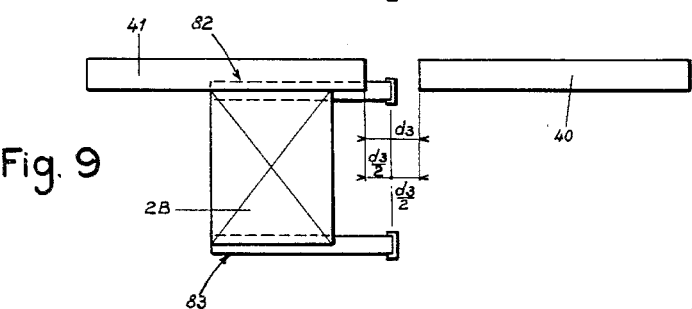

In FIG. 9 the box 2B is shown in its final position, the tape 82 passing into the hollow space between the bar 41, and the table and adhered (by half its width) onto approximately ¾ the periphery of the box 2B. Cutting the gummed tapes 82 and 83 is then effected.

FIGS. 10 and 11 show transverse sections through guide bars 40 and 41. These shaped profiles are given by way of example only. It is to be noted that the heights $h$ should be sufficient to ensure a suitable guidance of the boxes to be closed; and that the free spaces $e$ into which the gummed tapes extend should be at least equal to a half the width of the tape.

Figure 12:
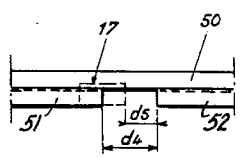
FIG. 12 is a possible modification of the guide bar.

FIG. 12 represents a guide bar 50 which can be substituted for the two bars 40 and 41, provided they present a clearance equal to $d_3$ (see FIG. 9) in the upper surface of the profile chosen. This type of guide bar 50 constitutes solely a possible modification for sticking gummed tapes to the angles of boxes. It is necessary however either to provide a plurality of bars 50 having different distances between portions 51 and 52 according to the dimensions of the boxes, or a single bar 50, provided with a clearance $d_4$ as big as possible, but reducible to $d_5$ by means of a small movable plate 17.

According to the principles of guiding with two separate bars (FIGS. 8 and 9), a further modification (not shown in the drawings) may be realized by retaining the left-hand bar 41 and replacing that on the right by an angle iron, the vertically extending portion of which would act as a guide, being aligned with the box engaging edge of the bar 41. In other words it is not necessary that the bar on the right provide a free space $e$ as shown in FIGS. 10 and 11 since the tape will reside on top of the box when the box is being guided by the angle iron.

Figure 13:
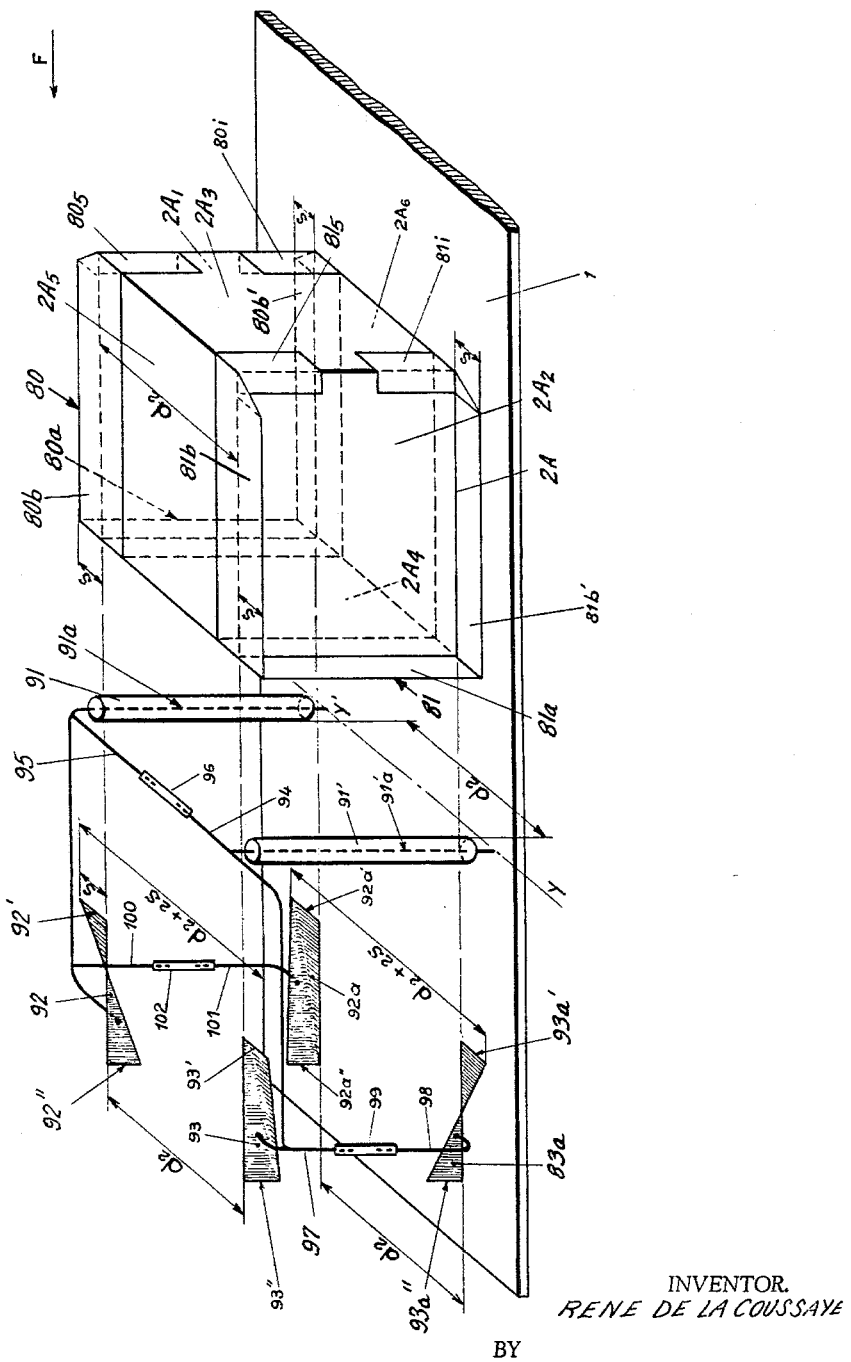
FIG. 13 is a perspective view of a device for the automatic sticking down of the projecting parts of the tapes.

FIG. 13 shows, in perspective, a work-table 1 on which rests a box 2A encircled by tapes 80 and 81, half the width of which are struck along the edges of the box 2A. This occurs in the final stage of the operations defined above. The upper ends of the tapes 80 and 81 as well as the lower ends $80_1$ and $81_1$ are then applied by hand onto the faces $2A_1$, $2A_2$ and $2A_3$ of the box 2A.

These sticking operations are the only ones to be effected by hand. All the other projecting parts of the tapes 80 and 81 are stuck down automatically onto the lateral walls of the box.

The operator pushes the box 2A in the direction of the arrow F. The box meets the vertical rollers 91 and 91' whose peripheries are spaced apart by distance $d_2$ equal to the length of the box, in such a way that the rollers enter into tangential contact with the vertical faces $2A_1$ and $2A_2$. These rollers mounted loosely on axes 91a and 91a' apply the two halves of the tapes 80a and 81a onto the faces $2A_1$ and $2A_2$ of the box 2A.

The rollers mounted on the table 1 as will be described may be moved towards or away from one another, as required, along the axis yy', owing to a vertical transverse groove in the table (not shown).

The sliding of the box occurs always in the same direction as arrow F. The four horizontal halves of sticky 80b, 80b', 81b and 81b', come in contact respectively with deflecting or deviating means 92, 92a, 93 and 93a. The spacing between the upper deflecting means 92 and 93, corresponding to that between the lower deflecting means 92a and 93a should be such that the distance between the horizontal edges 92' to 93', 92a' to 93a' should be at least equal to $(d_2+2S)$, that is to say, to the length of the box plus two halves of the tape. The spacing between the vertical edges 92" and 93" of the upper deviating means is identical to the spacing between the vertical edges 92a" and 93a" of the lower deviating means; it should be equal to the length $d_2$ of the box 2A.

The spiral form of the deflecting means, described further on, progressively guides the portions of the tapes 80b, 80b', 81b and 81b' from the horizontal position to the vertical position.

It can be seen that when the box 2A has slid completely between the four appropriately shaped deflecting means the four portions of the horizontal tapes are gradually deflected thereby to the vertical faces $2A_1$ and $2A_2$ of the box. At this instant the work on the angles of the box is entirely finished.

In order that the system should work it is essential that the dispensing devices, the rollers and the deflecting means are maintained with a spacing $d_2$ therebetween, determined by the length of the box. This spacing should remain constant during all the operations.

It can be seen from FIGURE 13 that the arms 94 and 95, connected to the deflecting means 92 and 93, are joined together by a telescopic sleeve 96 facilitating the variation of the distance $d_2$. The rods 97 and 98, connected by the telescopic sleeve 99, and rods 100 and 101, connected by the sleeve 102 likewise telescopically, may be extended or shortened as a function of the height of the box.

In order to keep the drawings clear, the relationship between the spindles and the deflecting means and between the deflecting means themselves are shown schematically. The assembly formed by the spindles, arms, sleeves, deflecting means and rods can be varied in height and length according to the sizes of the boxes, cases or packages being closed.

Figure 14:
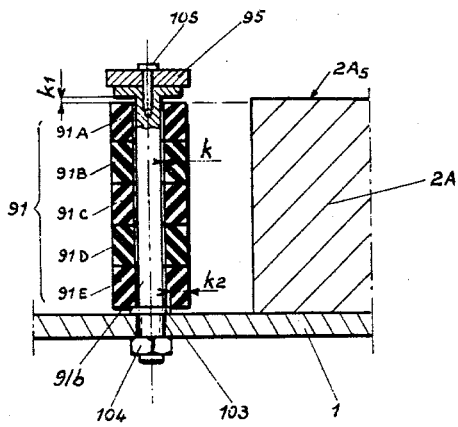
FIG. 14 is an axial section through a folding and pressing roller forming part of the device of FIG. 13.

FIG. 14 is the mounting for a roller 91. This roller is formed by a stack of rings 91A, 91B, 91C, 91D and 91E preferably made of rubber or other elastomeric material mounted on a spindle 91G and resting on a disc 103, having a thickness of between 2–3 mm., positioned between the table 1 and the lower ring 91E. The spindle 91G extends through the table and is fixed by a nut 104. All five rings are mounted on the spindle 91G with a freedom $k$ permitting their free turning movement. In order to avoid the risk of crushing the halves of the horizontal tapes waiting to be applied onto the lateral faces $2A_1$ and $2A_2$ the rollers 91 and 91' have diameters approximately 10% greater than the width of the tape. Thus the spindle 91G and the spindle of the roller 91' will not possibly be able to contact tape portions 80$b$, 80$b'$, 81$b$, or 81$b'$.

The arm 95 is fixed onto the spindle 91G by a screw 105. It should be noted here that the upper level of the last ring 91A should be at substantially the same height as or lower than the horizontal plane $2A_5$ of the box 2A.

The solution is shown by way of example only. A modification of the system may consist in replacing the rubber rings by a single roller mounted on an identical spindle. In one case as in the other, it is necessary to define the height of the roller as a function of that of the box to be closed.

Figure 15:
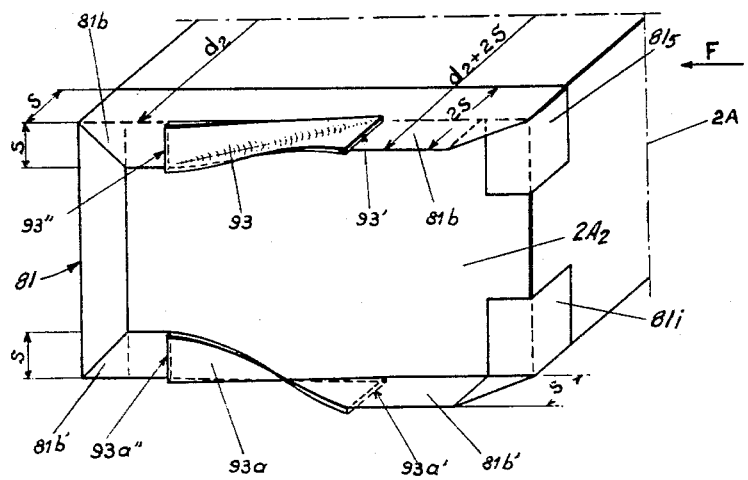
FIG. 15 is a partial view, in perspective of a box at the moment at which it passes into contact with the forming means of the device of FIG. 13.

FIGURE 15 shows a portion of the box 2A engaged between the deflecting means 93 and 93$a$. It can be seen on the right that the portions of the tapes 81$b$ and 81$b'$ not engaged beneath or on top of the deflecting means, are horizontal when on the right of the deflecting means, and are caused to be folded down by the deflecting means 93 and 93$a$, as they pass therethrough.

Figure 16:
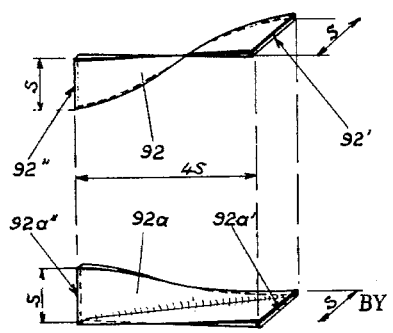
FIG. 16 shows in perspective view two deflecting means mounted in their operating position on the right-hand side of the box, relative to the direction of displacement of the latter.

FIGURE 16 shows an example of the shape of the upper and lower deflecting means 92, 92$a$, disposed horizontally. The entrance of the box occurs at the side of edges 92' and 92$a'$ disposed horizontally, and the exit of the box occurs at the side of the vertical edges 92'' and 92$a''$. The deflecting means, formed preferably of a very malleable metal, or an appropriate plastics material, are formed with a 90° spiral. Their length is preferably equal to about 4 times half the width of the sticky tape (4S).

The deviating means 92 (see upper left-hand corner) and 92$a$ (see lower right-hand corner) are identical to 93$a$ and 93 respectively.

I claim:
1. A device for placing a tape along the edges of a box comprising:
   a box supporting table having a first aperture therethrough;
   tape dispensing means located under said table and capable of dispensing tape through said first aperture;
   and guide means located above said surface for guidance of boxes along a substantial straight path on top of said surface, said guide means comprising,
   a first part located on said surface,
   and a box engaging part connected to said first part, said box engaging part extending into a plane passing through said first aperture and remaining at a fixed distance from said table during guidance of boxes along said path to provide a predetermined space between said box engaging part and said table.

2. The device of claim 1 in which said first part and said box engaging part are formed as an integral guide means.

3. The device of claim 1 in which said box engaging part is mounted to said first part for sliding movement relative thereto in a direction parallel to said path.

4. The device of claim 1 in which said table is provided with another aperture laterally spaced from said first aperture and another tape dispensing means located under said other aperture, said other tape dispensing means being capable of dispensing tape parallel to said path.

5. The device of claim 4 in which said other tape dispensing means may be selectively located a desired distance from said first aperture.

6. The device of claim 3 and further including spring means for urging said box engaging part toward a first position.

7. The device of claim 1 and further including a first and a second means disposed to engage portions of tape which have been applied to a box as it moves along said path, said first means engaging a first portion of said tape projecting laterally from the leading face of a box moving along said path and deflecting this portion against the adjacent vertically disposed face of this box; said second means engaging second and third portions of said tape extending laterally from upper and lower surfaces, respectively, of a box moving along said path and deflecting these latter portions against the vertically disposed face; said first means being disposed rearward of said second means so as to deflect said first portion of said tape prior to deflection of the second and third portions thereof.

8. The device of claim 7 in which said table is provided with another aperture laterally spaced from said first aperture and another tape dispensing means disposed under said other aperture, said other tape dispensing means being capable of dispensing tape parallel to said path; and third and fourth means for deflecting tape which has been applied to said box from said other dispensing means, said first and third means including at least one roller.

9. A device according to claim 8, in which the said rollers are of elastomeric material, mounted on fixed spindles of a height less than that of said box.

10. Device according to claim 8, in which the said second and fourth means are constituted by stationary deflecting means in the form of a spiral member, with rectilinear edges.

References Cited by the Examiner

UNITED STATES PATENTS

| 2,244,268 | 6/1941 | Smeltzly | 156—475 XR |
| 2,515,130 | 7/1950 | Locke et al. | 156—486 |
| 2,596,158 | 5/1952 | Lindsey | 156—486 |

EARL M. BERGERT, *Primary Examiner.*